United States Patent [19]

Beltz et al.

[11] 4,117,092

[45] Sep. 26, 1978

[54] PROCESS FOR SEPARATING A PHOSPHORIC ACID-SOLVENT SOLUTION

[75] Inventors: Klaus Beltz, Budenheim, Rhein; Klaus Frankenfeld, Hünfelden-Kirberg Mainzer, both of Germany

[73] Assignee: Chemishe Fabrik Budenheim, Budenheim, Rhein, Germany

[21] Appl. No.: 864,158

[22] Filed: Dec. 27, 1977

Related U.S. Application Data

[63] Continuation of Ser. No. 753,727, Dec. 23, 1976, abandoned, which is a continuation of Ser. No. 594,522, Jul. 9, 1975, abandoned.

[30] Foreign Application Priority Data

Jul. 3, 1974 [DE] Fed. Rep. of Germany ....... 2433307

[51] Int. Cl.² ............................................. C01B 25/16
[52] U.S. Cl. .................. 423/321 S; 423/313
[58] Field of Search ...................... 423/321 S, 312, 313

[56] References Cited

U.S. PATENT DOCUMENTS

| | | | |
|---|---|---|---|
| 1,981,145 | 11/1934 | Keller | 423/321 S |
| 3,367,738 | 2/1968 | Schallert et al. | 423/321 S |
| 3,764,657 | 10/1973 | Frankenfeld et al. | 423/321 S |
| 3,894,143 | 7/1975 | Semel et al. | 423/321 S |

FOREIGN PATENT DOCUMENTS 1,326,911  8/1973  United Kingdom ................. 423/321 S

OTHER PUBLICATIONS

J. Agr. Food Chem., Purification of WPA by Solvent Extraction, vol. 22, No. 6, 1974, pp. 1099-1106.

*Primary Examiner*—O. R. Vertiz
*Assistant Examiner*—Thomas W. Roy
*Attorney, Agent, or Firm*—Marn & Jangarathis

[57] ABSTRACT

There is disclosed a countercurrent multi-stage process for separating an organic solvent from a phosphoric acid solvent solution by the addition of an alkali material such that the ratio of $Na_2O$ to $P_2O_5$ in the water phase in each stage is from 0.45:1 to 0.90:1 whereby substantially all the organic solvent is recovered from the starting solution in the final stage of the extractor.

12 Claims, No Drawings

PROCESS FOR SEPARATING A PHOSPHORIC ACID-SOLVENT SOLUTION

This is a continuation of application Ser. No. 753,727, filed Dec. 23, 1976, abandoned, which is a continuation of application Ser. No. 594,522, filed July 9, 1975, abandoned.

This invention relates to a method of separating a tricomponent mixture, and more particularly to the separation of a solvent from a mixture comprised of phosphoric acid, an organic solvent and water.

BACKGROUND OF THE INVENTION

Phosphoric acid is generally produced in accordance with two processes. In one process, wet phosphoric acid is produced from phosphate ore by contact with a strong mineral acid, such as sulfuric acid. Calcium in the phosphate ore is generally separated in the process as gypsum whereas the other constituents in the phosphate ore remain in the phosphoric acid as dissolved solids or soluble salts to the extent they cannot form slightly soluble compounds in the strongly acid medium with either sulfuric or phosphoric acid. In many instances, these impurities interfere with the further use of the phosphoric acid, and often the employment of technical grade acid for many purposes is rendered impossible by these impurities. Efforts have not been lacking, therefore, to free the phosphoric acid or its alkaline salts of such impurities. In one long-used purification method the phosphoric acid is neutralized with alkalis. Accordingly, the impurities dissolved in the raw acid are precipitated as slightly soluble salts or metal hydroxides. This method is therefore suitable as a purifying method only if the phosphoric acid is to be converted into its alkali salts.

Recently, a plurality of extraction methods have been advanced wherein the depletion of impurities from wet method phosphoric acid is obtained by the addition of different organic solvents. Accordingly, phosphoric acid is preferably dissolved in an organic solvent phase while the impurities remain in the water phase. Such extraction methods are divided into two major categories depending on the differences in the physical behavior of the organic solvent with respect to the phosphoric acid. One category uses organic solvents or solvent mixtures which are not miscible with water or only miscible to a limited extent. The other category uses organic solvents or solvent mixtures which are miscible with phosphoric acid and water in all proportions.

Representative of extraction methods of the first category are described in German Pat. Nos. 1,277,221 and 1,162,817; German published application No. 1,294,944; U.S. Pat. No. 3,318,661 and British Pat. No. 1,093,927. Such methods require a certain $P_2O_5$ concentration in the raw acid in order to assure extractability of the acid by the organic solvent with phosphoric acid being recovered in a dilute water phase from the organic phase by return extraction.

The second category for purifying wet phosphoric acid utilizes miscible organic solvents, such as methanol, ethanol, propanol, acetone and methyl ethyl ketone. These solvents are homogeneous with phosphoric acid and water in all proportions. By addition of an alkali compound to the phosporic acid, impurities are precipitated when the acid is mixed with organic solvent. Purified phosphoric acid is separated from the solvent by distillation.

In German Pat. No. 648,295, there is described a method for purifying raw phosphoric acid by treating the phosphoric acid with an organic solvent in the presence of an alkaline compounds whereby the impurities, such as calcium, iron, aluminum, chromium, vanadium and fluorine are removed as a precipitate. Mentioned as solvents are methyl and ethyl alcohol and acetone. Alkaline compounds used in the process include free alkali and ammonium base, the salts of sulfuric acid, oxalic acid, carbonic acid, nitric acid and the like. Because of the large amounts of alkaline compounds required for purification, a partial desaturation of the phosphoric acid is effected. Additionally, the impurities settle-out as viscous, green clumps of oily appearance which only gradually become discrete.

German Pat. Nos. 2,032,263; 2,050,008; 2,050,406; 2,053,883 and 2,229,609 also describe methods for purifying wet phosphoric acid utilizing solvents which are miscible with water and phosphoric acid. According to these methods, the solvent is separated from the phosphoric acid by distillation. In German published application No. 1,952,104, there is disclosed a method for purifying wet method phosphoric acid by adding alkali and a water miscible solvent. The clean purified phosphoric acid is separated from the phosphoric acid/solvent/water mixture in the form of a monobasic neutralized salt. The supernatant light phase should consist substantially of water free alcohol, thereby eliminating distillation as the method for separating the solvent. When a less concentrated raw acid is purified, the solvent phase contains a high concentration of water after separation of the phosphoric acid as alkali phosphate. When using concentrated raw acids, a self-solidifying alkali-phosphate melt is obtained, i.e., a solid crystal layer results which is difficult to separate and which can only be eliminated by effecting separation at high temperatures, e.g., 100° C.

In German published publication No. 2,029,564, there is disclosed a method for recovering phosphoric acid in the form of mono-, di-, or tri-alkali orthophosphate from a phosphoric acid/solvent/water mixture. Solvents which are used are able to absorb at least nine percent by weight of water thereby limiting the number of solvents which may be used alone or in admixture with other solvents.

In accordance with British Pat. No. 1,345,710, a method is disclosed for making phosphoric acid and alkali metal phosphates by mixing a wet method phosphoric acid with water miscible solvents, such as acetone, isopropanol and condensated alkali or ammonium phosphate solvents, such as tripolyphosphate, pyrophosphate or long chained polyphosphate solvents. A phosphoric acid/solvent phase and a water polyphosphate impurity phase are formed with the latter phase containing the impurities. The two phases are brought into countercurrent contact by means of a mixer-settler apparatus and are again separated. Free phosphoric acid is separated in a distillation column from the acid/solvent phase if phosphoric acid is to be recovered and alcohol to be recycled to the process.

A different method for obtaining an alkali phosphate salt from a phosphoric acid/solvent phase by eliminating distillation is by treating the organic phosphoric acid with an alkali so that the acid separates from the mixture in the form of an alkali phosphate with a Na/P ratio of at least 1:1.

British Pat. No. 1,345,710 teaches that when neutralizing phosphoric acid with alkali that serious problems are present up to a 1 base or to the 1.67 base alkali phosphate stage due to crystalization tendency which exists in an alkali phosphate base. Continuous extraction methods, therefore, are generally effective at elevated temperatures, e.g. of about 90° C. whereat the temperature must be constantly monitored and controlled. Such a temperature is clearly above the boiling point of the organic solvent of the main component thereby requiring elaborate devices to condensate the lower boiling solvent.

OBJECTS OF THE INVENTION

It is an object of the present invention to provide a novel process for separating an organic solvent from a mixture comprised of phosphoric acid, an organic solvent and water.

Another object of the present invention is to provide a novel process for separating an organic solvent from a mixture comprised of phosphoric acid, an organic solvent and water whereby the phosphoric acid is recovered in the form of an alkali phosphate.

Still another object of the present invention is to provide a novel process for separating an organic solvent from a mixture comprised of an organic solvent and water at low temperature levels thereby eliminating elaborate high temperature control devices.

A further object of the present invention is to provide a novel process for separating an organic solvent from a mixture comprised of phosphoric acid, an organic solvent and water with minimal heat requirements.

SUMMARY OF THE INVENTION

These and other objects of the present invention are achieved by admixing to a phosphoric acid/solvent/water mixture in a multi-stage countercurrent extractor and inorganic alkali compound or mixture in an amount thereof whereby two phases are formed in each stage and wherein the resulting alkali phosphate phase has an $Na_2O$ to $P_2O_5$ ratio of from 0.45:1 to 0.90:1, preferably 0.55:1 to 0.80:1 and wherein substantially all of the organic solvent is recovered. The organic solvent is miscible with phosphoric acid and water in all proportions. The organic solvent phase contains smaller portions of phosphoric acid in each stage of the process, with solvent, free from phosphoric acid separated by decantation from an alkali phosphate phase.

In accordance with the present invention, there is no tendency of crystallization thereby eliminating high temperatures operations. Further, an organic solvent phase is recovered which does not require treatment prior to recycling for contact with the wet phosphoric acid, i.e. the miscible organic solvent need not be contacted with a non-miscible solvent for reducing the water content of the recycled organic solvent.

DETAILED DESCRIPTION OF THE INVENTION

In accordance with the present invention, there is obtained a defined distribution of the total $P_2O_5$ component and the free $P_2O_5$ component between the water and organic phases dependent on the basicity of the salt phase which takes place when separating the mixture comprised of phosphoric acid, an organic solvent and water (hereinafter sometimes referred to as a "trimixture") by adding a quantity of alkali, such that neutralization is below that of the mono alkali orthophosphate stage. The following Table I illustrates the distribution of total $P_2O_5$ components between even volume portions at room temperature for a trimixture of phosphoric acid/isopropanol/water and concentrated water/salt phase consisting of a mixture of phosphate and sodium ions.

TABLE I

| Neutralization of the salt phase | Distribution of the total $P_2O_5$ component between trimixture phase/salt phase | |
|---|---|---|
| 0.4 | 1 | 1.0 |
| 0.5 | 1 | 2.5 |
| 0.6 | 1 | 4.8 |
| 0.7 | 1 | 10.0 |
| 0.8 | 1 | 50.0 |
| 0.9 | 1 | 130.0 |
| 1.0 | 1 | 690.0 |

The distribution of the free $P_2O_5$ concentration between the salt phase and the trimixture is different and shows that the free $P_2O_5$ concentration has a stronger tendency to remain in the organic phase whereby the position of the distribution balance weight depends from the neutralization of the salt phase. From the total quantity of free $P_2O_5$ component, the following Table II illustrates percentage distribution between phases dependent on neutralization results:

TABLE II

| Neutralization of the salt phase | Percentage distribution of the free $P_2O_5$ component between trimixture phase/salt phase | |
|---|---|---|
| 0.3 | 85 | 15 |
| 0.4 | 66 | 34 |
| 0.5 | 49 | 51 |
| 0.6 | 34 | 66 |
| 0.7 | 21 | 79 |
| 0.8 | 11 | 89 |
| 0.9 | 4 | 96 |
| 1.0 | 1 | 99 |

From Table II, it can be seen that a ratio of $Na_2O:P_2O_5$ of about 0.45:1 that the distribution of the free phosphoric acid is evenly balanced between both phases. At a lower neutralization stage of the salt phase, the greater component of the free phosphoric acid remains in the trimixture. At a higher neutralization (which is above the 0.45 basic), the greater component of the free phosphoric acid remains in the salt phase. The limit condition is finally obtained in a mono and higher basic neutralization when practically no free phosphoric acid is present in the system. This surprising behavior of the phosphoric acid between the trimixture and a watery concentrated sodium phosphate solvent having a ratio smaller than 1:1 can be used to obtain a separation of phosphoric acid/solvent/water mixtures in a multistage countercurrent extractor.

If the operation is based on a liquid-liquid countercurrent extraction, a practically complete separation of the trimixture can be obtained with only 45–90% of the quantity of alkali required for a mono basic neutralization of the phosphoric acid which would be present in the trimixture. When one limits the quantity of alkali to about 45% of that required quantity, a plurality of extraction steps are required so as to obtain a complete separation of the trimixture, while with an alkali quantity of 90% of the required quantity, results in fewer extraction steps. It has been found preferable to limit the required quantity of alkali to that within the range of 50–80% to render reasonable the number of the required extraction steps.

One advantage of the technique of the present invention is the recovery of salt phases in the form of highly concentrated $P_2O_5$-enriched water phases which are considerably more concentrated than with a saturated solvent of the mono basic phosphate. At a basicity of 0.45, the sodium salt phases have a $P_2O_5$ concentration of 42%. At a basicity of 0.7, the $P_2O_5$ concentration in the salt phase is about 41%. In contrast thereto the $P_2O_5$ concentration in a saturated mono sodium orthophosphate solvent at 20° C. is only about 29% $P_2O_5$, but such $P_2O_5$ concentration cannot be maintained in actual practice since such concentrated saturated solvents have a tendency to crystallize. The saturated solvents of other sodium orthophosphates which are neutralized higher than mono basic solvents have a lower $P_2O_5$ concentration at a temperature of 20° C. Hence, it is advantageous that the resulting salt phase obtained in accordance with the present invention does not exhibit a tendency to crystallize despite high $P_2O_5$ concentration. Hitherto, this advantage has not been recognized.

In order not to obtain in any extraction stage a neutralization in excess of a ratio of $Na_2O:P_2O_5$ of 1:1, which would result in a crystal separation within the extraction apparatus, the addition of alkali, in accordance with the present invention is effected in a plurality of zones in the extraction apparatus. In the trimixture, i.e. phosphoric acid/solvent/water, the $P_2O_5$ concentration can fluctuate within wide ranges provided the separation is carried out in accordance with the present invention. In a practical application, the $P_2O_5$ concentration in the trimixture is established in the preceeding purification process for wet phosphoric acid. Tests have shown that trimixtures having a $P_2O_5$ concentration of more than 25% may only be separated whereas with the present invention the $P_2O_5$ concentration in the trimixture is not limited with respect to such a low range. All of the alkali and ammonium ions may be used for separation purposes, however, the preferred alkalis are obtained from the sodium compounds. While the potassium or ammonium based alkalis may be used to effect a separation of the trimixture, the tendency for crytallization is much greater when compared with that of sodium compounds. Hence, the concentration of the salt phase is therefore lower by using sodium. The alkali compounds of the present invention include all alkali compounds, particularly the alkali-oxides, alkali hydroxides, alkalicarbonate and the polybasic neutralized alkali salts of phosphoric acid.

The addition of an alkali compound into the countercurrent extractor may be effected in the form of a high percentage solution when using the alkali-hydroxides and alkali phosphates, or in solid form when using alkali-carbonates, or in gaseous form when using ammonia.

The solvents which are miscible with water and phosphoric acid in all proportions include the aliphatic alcohols, such as methanol, ethanol, propanol-1, and propanol-2, ketones, such as acetone, methyl ethyl ketone etc., and ethers, such as dioxane. The aforementioned solvents may be used individually or in given ratios. Methanol can only be used with another solvent. When using such solvents or mixtures thereof, a second immiscible phase is formed by alkali addition when treating the trimixture.

The extraction is effected at a temperature between about 10° C., to the boiling point of the organic solvent, preferably, of from 20° C. to 50° C. The heat of neutralization results in an increased temperature within the system. The upper temperature limit corresponds to the boiling temperature of the organic solvent, however, as a practical matter, such a temperature is not reached. It is not necessary to increase the temperature above the boiling point of the solvent. The obtained acid concentrated salt phase has very strong water binding characteristics. Thus, when separating the trimixture, not only the phosphoric acid is converted into the salt phase but also a great portion of the water which is present in the trimixture. By mixing a commercially available phosphoric acid having a $P_2O_5$ concentration of 54% with an isopropanol-water mixture having a composition of 87.0% propanol-2 and 13% water, the following trimixture is obtained:

15.6% $H_3PO_4$
68.8% propanol-2
15.5% $H_2O$

A separation was performed using water free soda and commercially obtainable 50% caustic soda respectively corresponding in amount to the quantity of the alkali required for a mono neutralization. The phosphoric acid is separated in form of a crystal layer. The separated solvent has a composition of 80.2% IPA and 19.8% $H_2O$ when using water free soda, and a composition of 73.6 IPA and 26.4% $H_2O$ when using 50% caustic soda. During neutralization up to the monobasic stage and crystallization, the solvent has a strongly increased water concentration with respect to the water concentration of the solvent which is used for making the trimixture. However, when the separation is carried out with the same rimixture by using an alkali quantity which is required for a $Na_2O$ to $P_2O_5$ ratio of 0.7:1, the solvent phase was comprised of 87% propanol-2 and 13% water.

When using water free soda, the solvent phase obtained is comprised of 89.3% IPA and 10.7% $H_2O$. When using 50% caustic soda the solvent phase is comprised of 87.0% IPA and 13.0% $H_2O$. Therefore, when using 50% caustic soda, the quantity of water which is discharged with the salt phase, corresponds to the quantity of water which is introduced into the system with the raw acid and the alkali solution. When using water-free alkali, the water concentration in the solvent, after separation of the trimixture, is less than at the beginning of the cycle. In this event, the water content may be adjusted by using more dilute raw acid. Thus, the present invention provides technical advances in phosphoric acid purification processes (not anticipated by the prior art) as follows:

(a) A trimixture material is separated using solvent components miscible in unlimited degrees with water and phosphoric acid eliminating the use of immiscible solvents.

(b) The solvent phase recovered from the separation is recycled to the purification zone without pretreatment.

(c) The phosphoric acid separated from the trimixture is in the form of a liquid concentrated salt phase having a high $P_2O_5$ concentration thereby eliminating further processing utilizing evaporative techniques.

(d) Since the salt phase does not exhibit any tendency for crystallization, separation is effected at ambient temperatures eliminating measures or apparatus required for operation at elevated temperatures.

(e) Since a large amount of the total phosphate in the salt phase is in the form of free phosphoric acid, the salt phase may be used in such form.

EXAMPLES OF THE INVENTION

The following example is illustrative of conditions for the process of the invention, and it is to be understood that the scope of the invention is not to be limited thereby.

EXAMPLE I 5,000 liters of a trimixture prepared from a wet phosphoric acid and a solvent mixture consisting of 87.0% propanol-2 and 13.0% water, after acid treatment analyzed as follows:

| Component | % |
|---|---|
| $H_3PO_4$ | 16.7 |
| propanol-2 | 70.1 |
| water | 13.2 |
|  | 100.0 |
| density | 0.920 |

In a 10 stage mixer-settler extraction unit operating at a medium temperature of 36° C., 426 kg of a 50% caustic soda are added to form a second phase. The caustic soda addition is effected in the final 3 mixing zones by adding to mixers No. 10, No. 8 and No. 9, 10%, 60% and 30%, respectively, of the total caustic soda addition. The resulting salt phases are brought into countercurrent contact with the trimixture whereby at settler No. 1, the salt phase including phosphoric acid is discharged in a quantity of 1,368 kg having the following composition:

| Component | % |
|---|---|
| $P_2O_5$ | 40.7 |
| $Na_2O$ | 12.1 |
| $H_2O$ | 47.2 |
|  | 100.0 |

The solvent phase discharged from settler No. 10 in a quantity of 3,705 kg had the following composition:

| Component | % |
|---|---|
| propanol | 87.0 |
| $H_2O$ | 13.0 |
|  | 100.0 |

Numerous modifications and variations of the invention are possible in the light of the above teachings and therefore the invention may be practiced otherwise than as particularly described.

What is claimed is:

1. A countercurrent multi-zoned process for separating an organic solvent from a phosphoric acid-solvent-solution whereby the organic solvent is miscible in all proportions with phosphoric acid and water to separate substantially all of said organic solvent as a mixture of water and organic solvent by the addition of an alkali material comprising the steps:
   (a) introducing said phosphoric acid-solvent-solution into a first zone of a multi-zoned extractor;
   (b) introducing an alkali (M) compound wherein the cation is selected from the group consisting of sodium, potassium, and ammonium ions into said multi-zoned extractor in a zone downstream from said first zone of said multi-zoned extractor to effect a countercurrent contact in said multi-zoned extractor of said solution, the amount of alkali compound being added to cause in each zone a phase separation of said solution into an aqueous alkali phosphate phase and a solvent phase whereby an aqueous alkali phosphate phase in each zone of said multi-zoned extractor has a mole ratio of $M_2O:P_2O_5$ of from 0.45:1 to 0.90:1;
   (c) separating by decantation in each zone of said multi-zoned extractor said alkali phosphate phase and said solvent phase, prior to passage of said respective phases to an upstream and downstream zone, respectively, of said multi-zoned extractor;
   (d) withdrawing said aqueous organic solution substantially free of phosphoric acid from a last zone of said multi-zoned-extractor; and
   (e) withdrawing said aqueous alkali phosphate solution having a ratio of $M_2O:P_2O_5$ from 0.45:1 to 0.90:1 substantially free of organic solvent from said first zone of said multi-zoned-extractor.

2. The process as defined in claim 1 wherein said organic solvent is selected from the group consisting of an aliphatic alcohol, ketone or ester.

3. The process as defined in claim 2 wherein said organic solvent is an aliphatic alcohol with having from 1 to 3 carbon atoms.

4. The process as defined in claim 1 wherein said organic solvent is methyl ethyl ketone.

5. The process as defined in claim 2 wherein said organic solvent is dioxane.

6. The process as defined in claim 2 wherein said alkali compound is an alkali carbonate.

7. The process as defined in claim 2 wherein said alkali compound is an alkali oxide.

8. The process as defined in claim 2 wherein said alkali compound is an alkali hydroxide.

9. The process as defined in claim 2 wherein said alkali compound is a polybasic neutralized alkali salt of phosphoric acid.

10. The process as defined in claim 2 wherein said ammonium ion is formed by bubbling gaseous ammonia through said solution.

11. The process as defined in claim 2 wherein said separation is effected at a temperature of between about 10° C., to the boiling point of the organic solvent.

12. The process as defined in claim 2 wherein said mole ratio is 0.55:1 to 0.80:1.

* * * * *